Jan. 30, 1923.
D. F. COMSTOCK.
LIGHT PROJECTION.
FILED FEB. 9, 1920.
1,443,731
5 SHEETS-SHEET 1
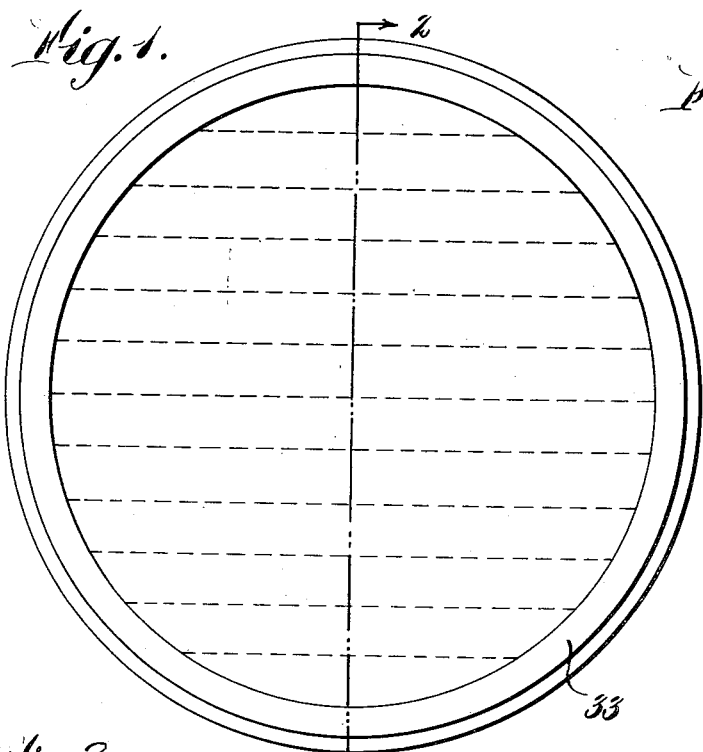
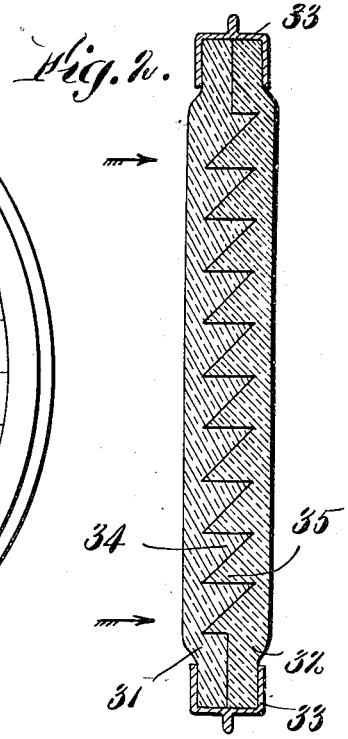
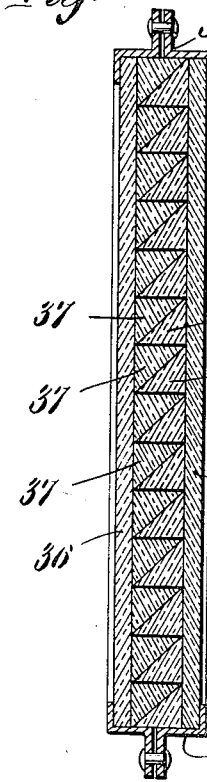
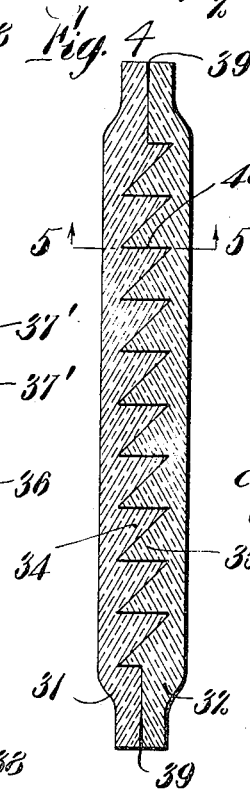
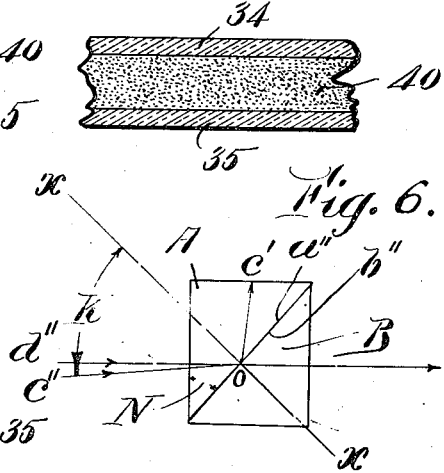
Inventor:
Daniel F. Comstock
by Roberts Roberts & Cushman
Attys.

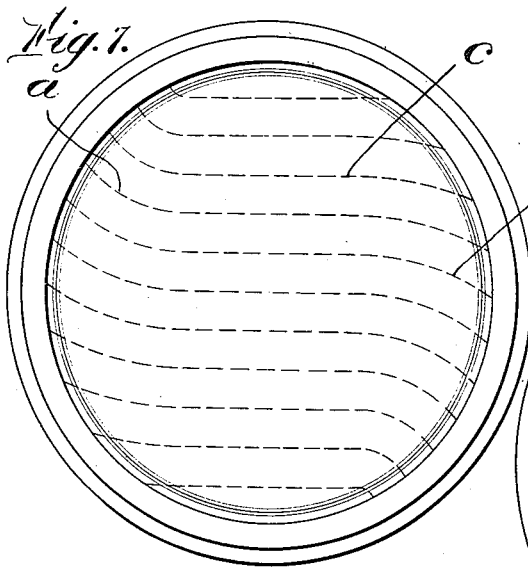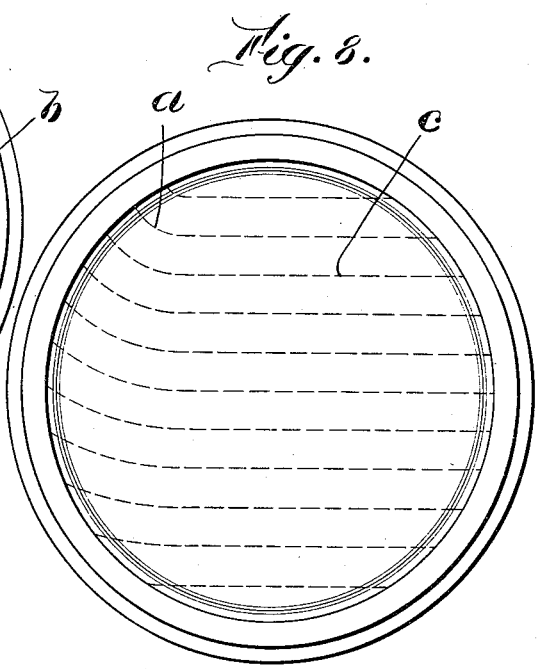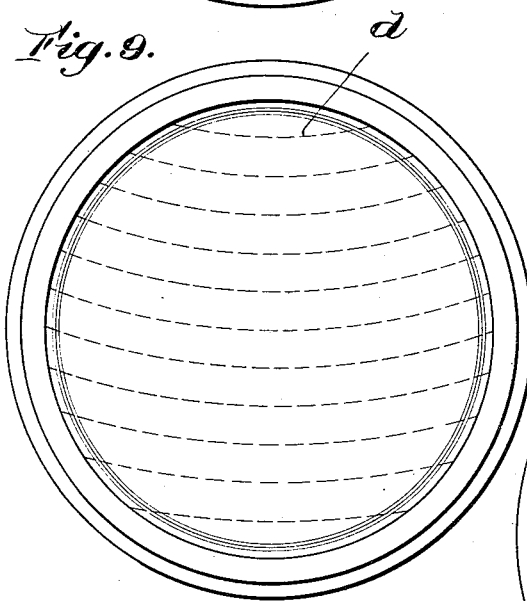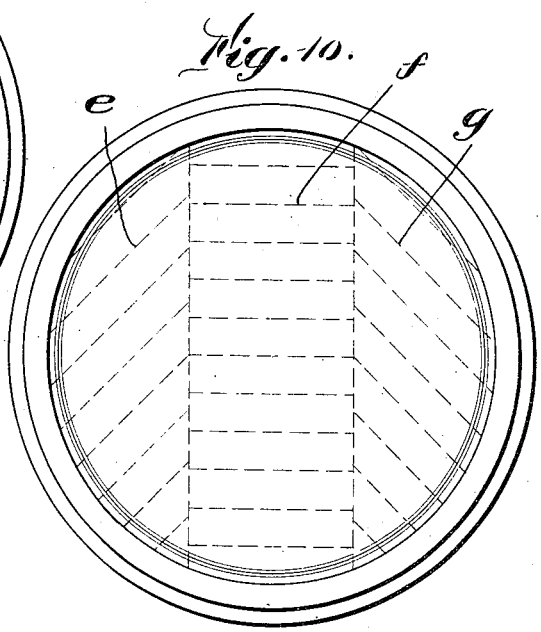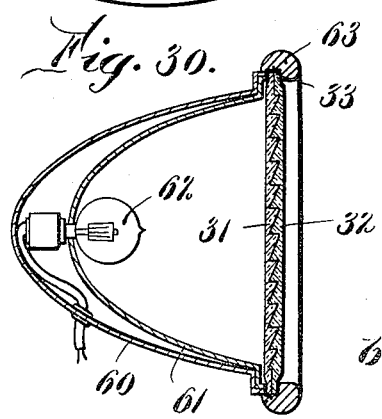

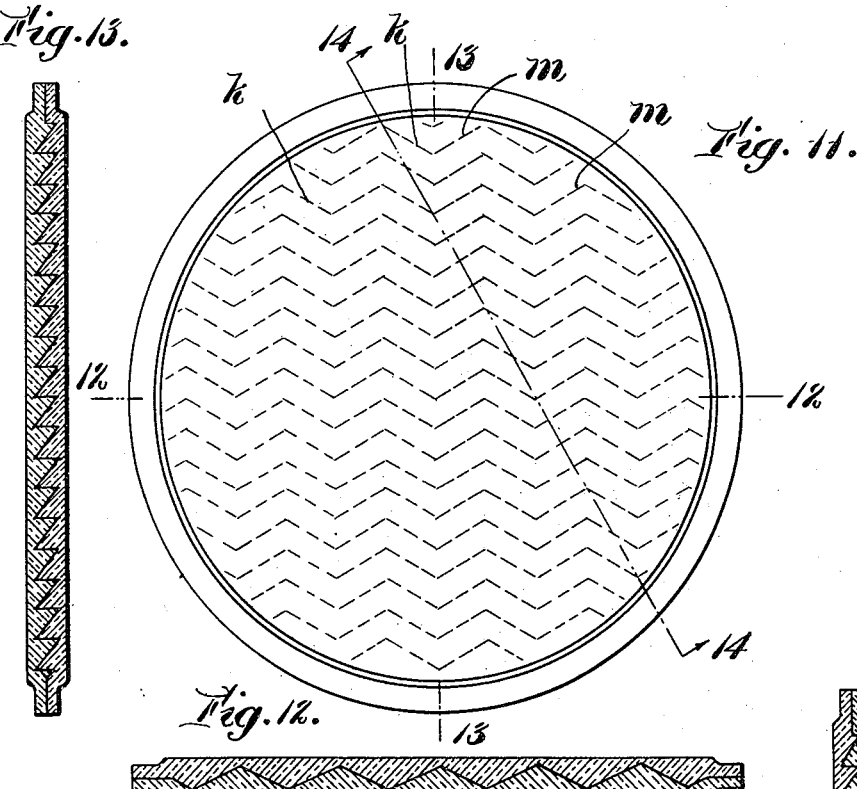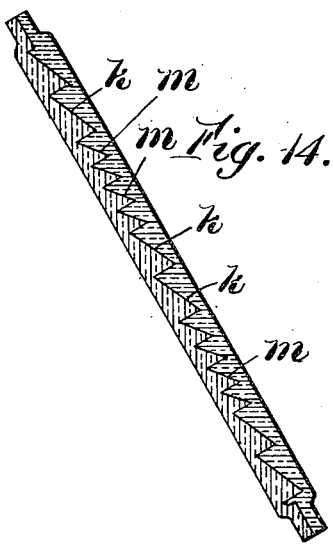

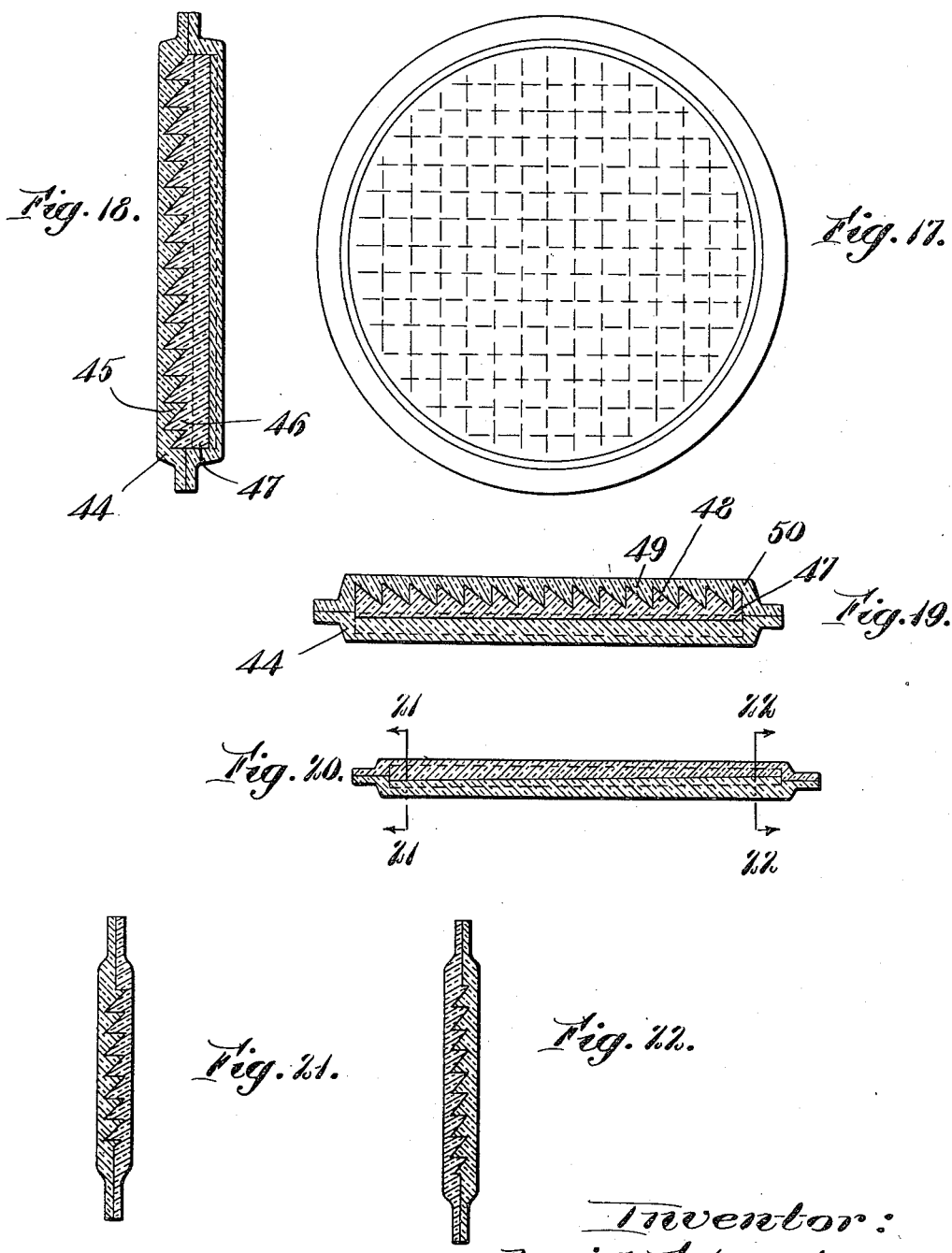

Jan. 30, 1923.　　　　　　　　　　　　　　　　　　1,443,731
D. F. COMSTOCK.
LIGHT PROJECTION.
FILED FEB. 9. 1920.　　　　　　　　　5 SHEETS-SHEET 5

Inventor:
Daniel F. Comstock
by
Roberts Roberts & Cushman
attys.

Patented Jan. 30, 1923.

1,443,731

UNITED STATES PATENT OFFICE.

DANIEL F. COMSTOCK, OF CAMBRIDGE, MASSACHUSETTS, ASSIGNOR TO KALMUS, COMSTOCK & WESCOTT, INC., OF BOSTON, MASSACHUSETTS, A CORPORATION OF MASSACHUSETTS.

LIGHT PROJECTION.

Application filed February 9, 1920. Serial No. 357,267.

*To all whom it may concern:*

Be it known that I, DANIEL F. COMSTOCK, a citizen of the United States of America, and resident of Cambridge, in the county of Middlesex and State of Massachusetts, have invented new and useful Improvements in Light Projections, of which the following is a specification.

This invention relates to an apparatus for eliminating the glaring rays from a beam of light by reflecting, deflecting, absorbing, diffusing or otherwise intercepting those rays of a beam of light having certain directional characteristics, this application being a companion to my copending application Serial No. 92,750, filed April 21, 1916.

Broadly considered the invention consists in an application and utilization of the principle of the critical angle of reflection whereby rays of different directional characteristics may be separated and thereafter treated independently and in any way desired, as for example distributing or projecting a certain part of a beam of light in a predetermined zone, the distribution in that zone being of any desired nature, while treating the other part of the light which if projected would fall outside that zone likewise independently and in any desired manner. For instance, this latter light may be either eliminated altogether or projected in some manner other than the light falling within the predetermined zone above mentioned.

The object of the invention is to provide a translucent screen for headlights having internally thereof a series of prisms whose oblique surfaces act as critical angle reflectors to reflect all light rays directed above the predetermined boundary. It is a further object to provide means for diffusing, absorbing, deflecting, reflecting or otherwise intercepting the reflected light.

An additional object in connection with the use of my invention in automobile headlights is to provide a translucent screen whereby a relatively large area close to the screen is illuminated with a light of a certain intensity and a more restricted area at a greater distance in front of the screen is illuminated by a light of approximately the same intensity at the area illuminated.

I have illustrated several preferred embodiments of my invention in the accompanying drawings in which—

Figure 1 is a front view of my improved translucent screen;

Figure 2 is a cross section of Fig. 1 on line 2—2;

Figure 3 is a view similar to Fig. 2 but of a modified form of the device;

Figure 4 is a view similar to Fig. 2 but of a slightly modified form;

Figure 5 is a broken away view on line 5—5 of Fig. 4;

Figure 6 is a diagram illustrative of the principle of the invention;

Figure 7 is a front view of a modified form of the device;

Figure 8 is a front view of a further modification of the device;

Figure 9 is a front view of another modification of the device;

Figure 10 is a front view of still another modified form of the device;

Figure 11 is a front view of a differently modified form of the device;

Figure 12 is a cross section of Fig. 11 taken on line 12—12;

Figure 13 is a cross section of Fig. 11 taken on line 13—13;

Figure 14 is a cross section of Fig. 11 taken on line 14—14;

Figure 15 is a vertical cross section of a modified form of the device;

Figure 16 is a vertical cross section of a further modification of the device;

Figure 17 is a front view of a compound form of the invention;

Figure 18 is a vertical cross section of Fig. 17;

Figure 19 is a horizontal cross section of Fig. 17;

Figure 20 is a horizontal cross section of a modified form of the device;

Figure 21 is a cross section of Fig. 20 on the line 21—21;

Figure 22 is a cross section of Fig. 20 on the line 22—22;

Figure 30 shows my improved screen mounted in a headlight.

Figure 23:
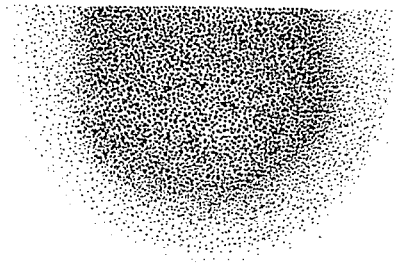
Figure 23 is a view showing in a general way the distribution of the light projected on a surface placed in front of the headlight by the form of screen shown in Figs. 1 to 4, viewed from the headlight side of the surface.

The method in which the simplest form of my device functions is indicated by the diagram shown in Fig. 6. In this figure, the reflecting prism is designated A, having the oblique reflecting surface $a''$, the line $x$—$x$ being the normal to the reflecting surface. Opposite to the reflecting prism in the reverse position is the counter refracting prism B with its oblique surface $b''$ opposing the surface $a''$.

The arrow line $c''$—$c'$ represents a ray of light entering the prism A so that it strikes the surface $a''$ at the critical angle and is reflected to $c'$ while the line $d''$—$d'''$ represents a ray having a smaller angle of incidence, which is therefore not reflected (except in part as hereinafter pointed out) but passes through to $d'''$. The upward refraction which occurs as the ray leaves the surface $a''$ is counteracted by the downward refraction as the ray enters the parallel surface $b''$ and the ray is in effect a straight ray.

As shown by this diagram the angle N, which is the angle the reflecting surface makes with the vertical, is preferably made such that it reflects all rays which strike the lens at a small predetermined angle above the horizontal along the line $c''$—$o$ or at any greater angle above the horizontal. All rays transmitted through the prisms emerge in the same direction in which they enter.

The angle N will depend upon the refractive index of the media, and upon the angle above the horizontal through which it is desired to permit the rays to pass. I have found that a prism of ordinary glass having a refractive index of 1.5 and a critical angle of 41.7° is suitable.

The upper surface of the reflecting prism upon which the reflected ray $c'$ impinges may be treated so as to absorb, to diffuse, to deflect, to reflect or to otherwise obstruct the light which reaches it, or as an alternative various parts of such surface may be treated in different ways. If the surface is left transparent the light will pass into a prism similar to B above and will be reflected by a surface similar to $b''$. If the light is diffused some of the light will be so reflected. If the light is reflected by the upper horizontal prism surface it will pass forward and downward striking and illuminating the ground adjacent to the headlight.

As shown in Figs. 1 and 2 the screen comprises two oppositely faced prismatic plates of glass 31 and 32 held together by the rim or frame 33 or by the usual glass front supporting means of the headlight or other device in which it is to be used. The plate 31 carries the horizontally disposed prisms 34 which interfit with the oppositely faced prisms 35 carried by the plate 32. It is to be noted that both outer faces of the assembled lens are plane.

In the form shown in Fig. 3, the screen comprises two similar outer sheets of plane glass 36 which hold therebetween a plurality of separate prisms arranged in two opposed series 37 and 37'. The screen assembly is clamped in a rim or holder 38. It will be observed that although this screen is quite different in construction from that of Figs. 1 and 3, the resultant effect upon the light will be identical.

In Fig. 4 is shown a screen similar to that of Fig. 2 except that instead of being held together by a rim or holder, the edges of the two glass members are cemented or fused together as indicated at 39.

Fig. 5 is a cross section on the line 5—5 of Fig. 4 and there is indicated at 40 that the upper surfaces of the reflecting prisms may be frosted, roughened, painted, silvered or otherwise prepared to absorb, diffuse or reflect the light which reaches them. In Fig. 30 I have shown my improved screen mounted in a usual type of headlight. The headlight comprises the shell 60, the parabolic reflector 61, incandescent bulb 62 and the rim 63 which holds the screen in place. The screen shown is that illustrated in Figs. 1 and 2 having the members 31 and 32 retained in the frame 33.

In Fig. 23 I have shown the resultant light effect upon a screen of a beam of light after passing through the lenses shown in Figs. 1 to 4. The Figures 23 to 29 indicate in a general way the light distribution afforded by the several forms of screen. These figures represent approximately the effect produced by the light thrown upon a surface placed in front of the light and as viewed from the side of the surface adjacent the light source. These figures do not show the diffused portion of the glaring light, the darker portion representing the small intense cones and the marginal part the larger cone of transmitted light. It will be understood that the upper edge of the light may be made higher or lower relative to the light by a variation in the angle of the reflecting surface, designated N in the diagram shown in Fig. 6, in constructing the screen.

In Figs. 7 to 22 I have shown various different conformations of the reflecting and counter refracting prisms to accomplish different distributions of the light. It is to be understood that these various forms may be made by any one of the several structural methods illustrated in Figs. 2, 3 and 4.

Figure 24:
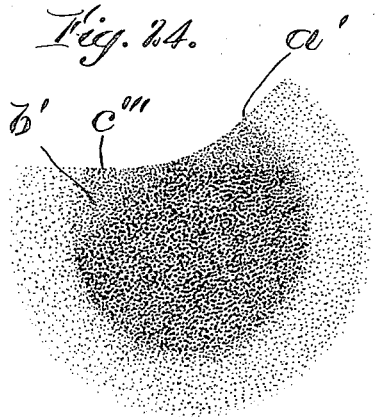
Figure 24 is a view similar to Fig. 23 but showing in a general way the light distributed by the form of screen shown in Fig. 7.
Figure 25:
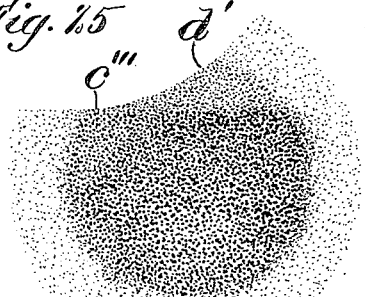
Figure 25 is a view similar to Fig. 23 but showing the light distributed by the form of screen shown in Fig. 8.

In Fig. 7 the prisms curve up on one side of the screen at $a$ and curve down on the other at $b$ which would give a light distribution somewhat as shown in Fig. 24. The upward curvature at $a$ causes the portion $a'$ of the light distribution, the angle of the upper edge of this portion depending upon the angle of the tangent to the upwardly curved portion $a$ of the prisms. The central portion of the lens with its horizontal prisms $c$ retains the major portion of the light below the horizontal line $c'$ and hence the portion $a'$ does not receive as much light as the adjacent portion below the line $c'$. The downward curvature at $b$ causes a part of the light to be deflected from the portion $b'$, the angle of the lower edge of this portion depending upon the angle of the tangent to the downwardly curved portion of the prisms. In Fig. 8 the prisms also curve up on one side of the screen at $a$ and the remainder $c$ of each prism is horizontal which gives the light distribution shown in Fig. 25. This distribution differs from that shown in Fig. 24 in that the curved top is somewhat higher in the center. These two forms may be desirable for use in automobile headlights with the two headlights of the machine having reversed lenses so that the sides of the road would be illuminated to a greater height than the road directly in front of the machine.

Figure 26:
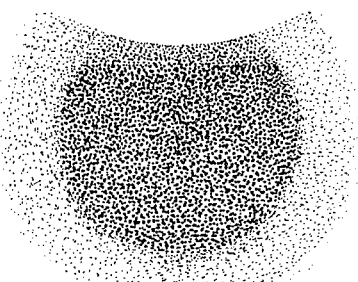
Figure 26 is a view similar to Fig. 23 but showing the light distributed by the form of screen shown in Fig. 9.

In Fig. 9 I have shown the prisms placed on a curve $d$ concave upward which will distribute the light as shown in Fig. 26. Here the light has an upper boundary which is a crescent-shaped plane the depth of the cresent depending upon the angularity between the tangents to the curve of the prisms.

Figure 27:
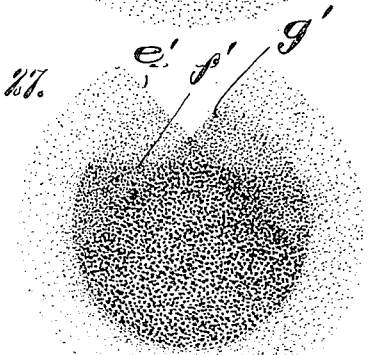
Figure 27 is a view similar to Fig. 23 but showing the light distributed by the form of screen shown in Fig. 10.

In Fig. 10 I have shown a form of lens which comprises three sets of prisms, the center set $f$ being horizontal, and the side sets $e$ and $g$ being similar and slanting outwardly and downwardly. This arrangement of prisms will give a light distribution as shown in Fig. 27. The resultant beam may be considered as three separate partly co-extensive beams. The central beam passing through the horizontal prisms has an upper boundary defined by a horizontal plane as shown at $f'$. The lateral beam $g$ has a slanting upper boundary defined by the plane $g'$, the angle of the prisms $g$ corresponding to the angle of the boundary $g'$ and similarly the lateral beam $e$ is defined by the plane $e'$. These combined form a beam whose illuminative effect is as shown in Fig. 27.

Figure 28:
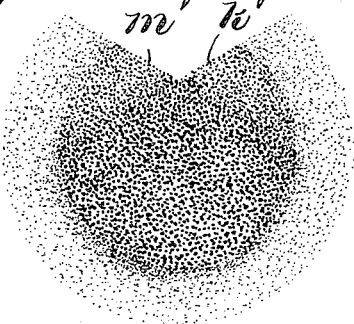
Figure 28 is a view similar to Fig. 23 but showing the light distributed by the form of screen shown in Figs. 11-14.
Figure 29:
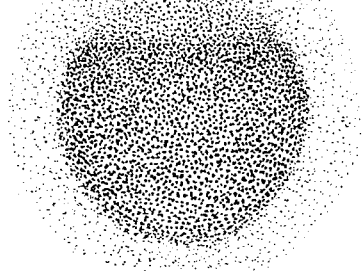
Figure 29 is a view similar to Fig. 23 but showing the light distributed by the form of screen shown in Fig. 15, the figures being partly broken away at top and bottom.

In Figs. 11 to 14 I have shown a lens formed with each prism alternately inclined upward and downward, these inclinations being equal in the several prisms so that the successive portions of the prisms are parallel. Fig. 12 shows the relation of the prisms as seen in horizontal cross section and Fig. 13 in vertical cross section. Fig. 14 is taken at an angle on the line 14—14. Such a construction gives a light distribution as shown in Fig. 28. Here are the equivalent of two partly coextensive beams, that passing through the portions $k$ of the prisms being bounded by the line $k'$ and that through the portions $m$ being bounded by the lime $m'$. The resultant beam therefore has a boundary formed by a V-shaped plane.

In Figs. 15 and 16 are shown two forms of screen in which the reflecting surfaces 41 and 42 are respectively convex and concave. In either of these cases the angle which marks the point on one side of which light is reflected and in the other side of which it is transmitted, varies throughout the curve. Therefore in both cases the cut off of the upwardly inclined rays is gradual and, instead of a definite limit to the light diffusion, the light will appear in the general form shown in Fig. 29.

In Figs. 17 to 19 I have shown a screen composed of three plates of glass and having two separate sets of prisms at right angles to each other. The plate 44 carries the horizontal extending reflecting prisms 45 which reflect rays more than a predetermined angle above the horizontal. These prisms interfit with the counter refracting prisms 46 on the interior plate 47. This interior plate 47 also carries the vertically extending reflecting prisms 48 which serve to reflect light striking them inclined more than a predetermined amount to the left as seen in Figs. 17 and 19. The prisms interfit with the counter refracting prisms 49 on the plate 50. The resultant beam of the light from this screen will be flattened not only on the top but one side, in this case the left, and a cross section of the beam would have the approximate shape of the quadrant sector of a circle.

In Fig. 20 I have shown a horizontal cross-section of a screen in which the reflecting surfaces are warped, being at a greater angle from the horizontal at the right and, as shown in Fig. 22, than at the left end, as shown in Fig. 21. In this case the resultant light beam will have an inclined upper surface instead of the flat surface shown in Fig. 23.

While I have described my new form of screen in connection with an automobile headlight it is obvious that it is much wider in its application. It will be of utility in connection with various schemes of floodlighting of buildings, advertisements, etc.

In such uses its function would be to serve to deliver a stream of light limited in one or more directions. In varying uses the screen might be rotated through ninety degrees to limit the light so as not to pass beyond the side of a building or sign or rotated one hundred and eighty degrees so as not to pass below a given line.

I have, by way of example, shown a number of various forms of my device both in regard to structural details and in regard to the prismatic forms and their relation to the resultant light beam. It is to be understood that these examples are merely illustrative of the broad and varied application of my invention.

A secondary characteristic of critical-angle reflectors which has been ignored herein for the sake of clearness and brevity is the following. While most of the rays striking the critical-angle reflecting surface at angles less than the critical angle, i. e., at angles more abrupt than the critical angle, are transmitted, a certain proportion of such rays are reflected, the proportion being larger immediately within the critical angle but rapidly decreasing to a minimum of about four per cent at the perpendicular. With the screens herein disclosed this reflected portion of the rays incident within the critical angle is treated in the same manner as the reflected rays incident at angles greater than the critical angle.

I claim:

1. A translucent screen having total-reflecting surfaces for reflecting rays incident thereto at angles outside the critical angle and for transmitting rays incident thereto inside the critical angle, and also having means for diffusing and transmitting one of said classes of rays.

2. A translucent screen for headlights, characterized by total-reflecting surfaces for reflecting upwardly inclined rays and for transmitting other rays without reflection and means for diffusing and transmitting the reflected rays.

3. A translucent screen for headlights comprising prismatic elements having total-reflecting surfaces for reflecting rays incident thereto at certain angles and having diffusing means at other surfaces to diffuse the reflected light.

4. A translucent screen for headlights comprising interfitting prismatic elements, certain surfaces of the elements being obliquely disposed in the path of the light to reflect the class of rays inclined in one direction relative to the horizontal while transmitting the class of rays inclined in the other direction relative to the horizontal, and diffusing means between certain surfaces of the interfitting prismatic elements to diffuse one class of rays.

5. A translucent screen for headlights comprising prismatic elements having total-reflecting surfaces disposed obliquely in the path of the light to reflect rays inclined in one direction from the horizontal, and means for diffusing upwardly inclined rays.

6. A translucent screen for headlights comprising prismatic elements having total-reflecting surfaces disposed obliquely in the path of the light to reflect upwardly inclined rays while transmitting other rays, and having diffusing means above said surfaces in the paths of the reflected rays to diffuse same.

Signed by me at Boston, Massachusetts, this 31st day of January 1920.

DANIEL F. COMSTOCK.